US011881587B2

(12) United States Patent
Ohta et al.

(10) Patent No.: US 11,881,587 B2
(45) Date of Patent: Jan. 23, 2024

(54) POUCH CELL

(71) Applicant: HONDA MOTOR CO., LTD., Tokyo (JP)

(72) Inventors: Masahiro Ohta, Wako (JP); Takuya Taniuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/578,508

(22) Filed: Jan. 19, 2022

(65) Prior Publication Data

US 2022/0278396 A1 Sep. 1, 2022

(30) Foreign Application Priority Data

Feb. 26, 2021 (JP) .................................. 2021-030658

(51) Int. Cl.
*H01M 50/105* (2021.01)
*H01M 50/531* (2021.01)
(Continued)

(52) U.S. Cl.
CPC ....... *H01M 50/105* (2021.01); *H01M 50/186* (2021.01); *H01M 50/531* (2021.01);
(Continued)

(58) Field of Classification Search
CPC ............. H01M 50/105; H01M 50/183; H01M 50/184; H01M 50/178; H01M 50/186; H01M 50/531; H01M 10/647
See application file for complete search history.

(56) References Cited

U.S. PATENT DOCUMENTS

| 2008/0076031 | A1 | 3/2008 | Yamaguchi et al. | |
| 2016/0315301 | A1* | 10/2016 | Kim | H01M 50/3425 |
| 2018/0219245 | A1* | 8/2018 | Choi | H01M 10/045 |

FOREIGN PATENT DOCUMENTS

| CN | 204257762 | 4/2015 |
| CN | 107851741 | 3/2018 |

(Continued)

OTHER PUBLICATIONS

Chinese Office Action for Chinese Patent Application No. 202210043045.1 dated Oct. 28, 2023.

*Primary Examiner* — Christopher P Domone
*Assistant Examiner* — Jonathan William Estes
(74) *Attorney, Agent, or Firm* — Amin, Turocy & Watson, LLP

(57) ABSTRACT

A pouch cell includes: a charging and discharging element; a current collecting tab lead configured to be thinner than the charging and discharging element and drawn out of the charging and discharging element to an outside; an exterior film configured to wrap the charging and discharging element in a state in which the current collecting tab lead is drawn out to an outside; a clamping part configured to clamp the current collecting tab lead from the exterior film by front and back surfaces in a thickness direction; and an airtightness maintaining member mounted to cover an end portion of the clamping part, wherein the airtightness maintaining member is separated from the exterior film, has a slit through which the current collecting tab lead is drawn out to the outside and has a bent part which covers an end portion of the clamping part, and a dimension of the bent part in the thickness direction of the clamping part is larger than a width dimension of the slit.

5 Claims, 11 Drawing Sheets

(51) Int. Cl.
*H01M 50/186* (2021.01)
*H01M 50/183* (2021.01)
*H01M 50/178* (2021.01)
*H01M 10/647* (2014.01)
*H01M 50/184* (2021.01)

(52) U.S. Cl.
CPC ........ *H01M 10/647* (2015.04); *H01M 50/178* (2021.01); *H01M 50/183* (2021.01); *H01M 50/184* (2021.01); *H01M 2220/20* (2013.01)

(56) References Cited

FOREIGN PATENT DOCUMENTS

| | | | |
|---|---|---|---|
| JP | 2011-243531 | 12/2011 | |
| JP | 2014-032790 | 2/2014 | |
| JP | 2015-069962 | 4/2015 | |
| JP | 2015069962 A * | 4/2015 | |
| WO | WO-2020110976 A1 * | 6/2020 | ........ H01M 10/0413 |

* cited by examiner

POUCH CELL

CROSS-REFERENCE TO RELATED APPLICATION

Priority is claimed on Japanese Patent Application No. 2021-030658, filed on Feb. 26, 2021, the contents of which are incorporated herein by reference.

BACKGROUND

Field of the Invention

The present invention relates to a pouch cell such as a battery.

Background

In recent years, with the spread of electric and electronic devices of various sizes such as automobiles, personal computers, and mobile phones, the demand for high-capacity and high-output batteries has rapidly expanded. Examples of such a battery include a liquid-based battery cell that uses an organic electrolytic solution as an electrolyte between a positive electrode and a negative electrode, or a solid-state battery cell using a solid electrolyte formed of a flame-retardant solid instead of an electrolyte which is an organic electrolyte.

As a solid-state battery, a laminated cell type pouch cell in which a rectangular parallelepiped cell is wrapped with a laminated film and sealed in a plate shape is known. Moisture and air intrusion into the battery are prevented by wrapping the cell with an exterior body (a film).

For example, Japanese Unexamined Patent Application, First Publication No. 2015-069962 discloses a pouch cell in which a battery body is wrapped with such a film and then packaged. Here, it is disclosed that the periphery of a positive electrode terminal and a negative electrode terminal is covered with a sealing member in which a slit is formed.

SUMMARY

However, the technology of Japanese Unexamined Patent Application, First Publication No. 2015-069962 has a problem that it is still insufficient to maintain airtightness.

An aspect of the present invention provides a pouch cell that enables improvement of airtightness and enhancement of strength.

A pouch cell according to a first aspect of the present invention includes: a charging and discharging element; a current collecting tab lead configured to be thinner than the charging and discharging element and drawn out of the charging and discharging element to an outside; an exterior film configured to wrap the charging and discharging element in a state in which the current collecting tab lead is drawn out to an outside; a clamping part configured to clamp the current collecting tab lead from the exterior film by front and back surfaces in a thickness direction; and an airtightness maintaining member mounted to cover an end portion of the clamping part, wherein the airtightness maintaining member is separated from the exterior film, has a slit through which the current collecting tab lead is drawn out to the outside and has a bent part which covers an end portion of the clamping part, and a dimension of the bent part in the thickness direction of the clamping part is larger than a width dimension of the slit.

A second aspect is the pouch cell according to the first aspect, wherein the airtightness maintaining member may have an extending part which is in contact with the current collecting tab lead and extends in a drawing direction of the current collecting tab lead.

A third aspect is the pouch cell according to the first or second aspect, wherein the airtightness maintaining member may have a fold reinforcing part which is folded back along a contour of the clamping part.

A fourth aspect is the pouch cell according to any one of the first to third aspects, wherein the airtightness maintaining member may have a triangular prism reinforcing part which is attached closer to the charging and discharging element than to the clamping part.

A fifth aspect is the pouch cell according to the fourth aspect, wherein the triangular prism reinforcing part may have a second fold reinforcing part which is attached to a gusset part that is closer to the charging and discharging element than to the clamping part.

A sixth aspect is the pouch cell according to any one of the first to fifth aspects, wherein the slit may have a central slit which extends along the front and back surfaces of the current collecting tab lead in the thickness direction and have end slits which extend in the thickness direction of the current collecting tab lead at both ends of the central slit, and the slit in the airtightness maintaining member before the airtightness maintaining member is mounted on the clamping part may have a substantially H shape.

A seventh aspect is the pouch cell according to any one of the first to fifth aspects, wherein the slit may have a central slit which extends along the front and back surfaces of the current collecting tab lead in the thickness direction and have end slits which extend in the thickness direction of the current collecting tab lead at both ends of the central slit, and the slit in the airtightness maintaining member before the airtightness maintaining member is mounted on the clamping part may be a through hole formed such that a dimension of the end slit in the thickness direction of the current collecting tab lead is equal to or slightly larger than a thickness of the current collecting tab lead.

An eighth aspect is the pouch cell according to the seventh aspect, wherein a contour of the through hole in the end slit may be circular, elliptical, or rectangular.

According to the first aspect, since an end surface of the laminated exterior film can be covered with the airtightness maintaining member at the end portion of the clamping part from which the current collecting tab lead is drawn out, it is possible to block an intrusion path through which air or the like enters the inside of the pouch cell. Thus, the airtightness of the pouch cell can be improved. At the same time, it is possible to improve an airtightness maintaining property in the clamping part which clamps the current collecting tab lead. Further, a lead overlap part can be formed, and the airtightness maintaining property of the lead part can be improved.

Here, the airtightness maintaining member can be made of the same film material as the exterior film. In this case, rigidity of the clamping part and the current collecting tab lead can be increased to improve strength by attaching the airtightness maintaining member to the clamping part. Therefore, in the pouch cell, a portion at which the current collecting tab lead is provided can be reinforced.

According to the second aspect, the airtightness between the current collecting tab lead and the end portion of the clamping part can be improved by attaching the extending part to the front and back surfaces drawn from the clamping part in the current collecting tab lead. The lead overlap part can be lengthened by forming the extending part, and the airtightness maintaining property of the lead part can be improved. Thus, it is possible to improve adhesion between the exterior film of the clamping part and the current collecting tab lead and to improve the airtightness without increasing the length of the clamping part in a drawing direction. In particular, the airtightness at the end portion of the clamping part at which the current collecting tab lead is drawn to the outside can be further improved.

According to the third aspect, since the fold reinforcing part is folded back and attached while covering a side portion of the clamping part that is lateral to the drawing direction of the current collecting tab lead, and the fold reinforcing part is wound up at a side surface of the clamping part and then welded in the vicinity of a portion in which the thickness of the front and back surfaces of the exterior film expands into a triangular prism shape from the clamping part toward the charging and discharging element, it is possible to prevent peeling of the welded portion due to an external force in the vicinity of a portion having a triangular prism shape, that is, to prevent cleavage of the clamping part.

Here, the side portion of the clamping part includes a side surface formed to intersect an end surface at which the current collecting tab lead is drawn from the clamping part, to connect the front and back surfaces of the clamping part with the exterior film and to extend in the thickness direction.

According to the fourth aspect, since the airtightness maintaining member has the triangular prism reinforcing part at a triangular prism portion formed by attaching the triangular prism reinforcing part to a triangular prismatic portion and covering the vicinity of the portion at which the exterior film is drawn out from the charging and discharging element to the outside of the current collecting tab lead, that is, a portion at which the clamping part is close to the charging and discharging element, an attachment area of the airtightness maintaining member is increased, and thus it is possible to improve the rigidity and strength of the triangular prism part by covering and reinforcing the exterior film of a triangular prismatic surface, which has room for improvement in terms of durability.

Here, since the current collector tab lead has a smaller thickness than the charging and discharging element, a portion thereof drawn out from the charging and discharging element to the outside of the current collecting tab lead becomes a step, and the exterior film covering this portion has a triangular prism shape. This portion needs to be reinforced in terms of strength, and rigidity is required.

According to the fifth aspect, the second fold reinforcing part is attached to the gusset part, and it is possible to increase the attachment area of the airtightness maintaining member and to cover and reinforce the exterior film at the gusset part in the vicinity of the triangular prism shape, which has room for improvement in terms of durability. Further, when a reinforcing plate is disposed at the triangular prism part, the reinforcing plate can be clamped by the airtightness maintaining member.

According to the sixth aspect, since the slit is formed in a substantially H shape, a portion surrounded by the central slit and the two end slits can be formed as the extending part. At the same time, a portion separated from the end slits further than the central slit in the direction along the central slit can be formed as the bent part.

According to the seventh aspect, since the slit is a through hole formed so that the size of the end slit in the thickness direction of the current collecting tab lead is equal to or slightly larger than the thickness of the current collecting tab lead, the bent part can be attached to an end part of the clamping part to maintain the airtightness without interfering with the current collecting tab lead. At the same time, the extending part can be attached to the surface of the current collecting tab lead to maintain the airtightness without interfering with the current collecting tab lead and the surface of the current collecting tab lead.

According to the eighth aspect, since the contour of the through hole in the end slit is circular, elliptical, or rectangular, the airtightness maintaining member can be easily attached without interfering with the current collecting tab lead.

DESCRIPTION OF EMBODIMENTS

Hereinafter, a pouch cell according to a first embodiment of the present invention will be described with reference to the drawings. The present invention is not limited to the following embodiments and can be implemented with appropriate modifications within the scope of the object of the present invention.

Figure 1:
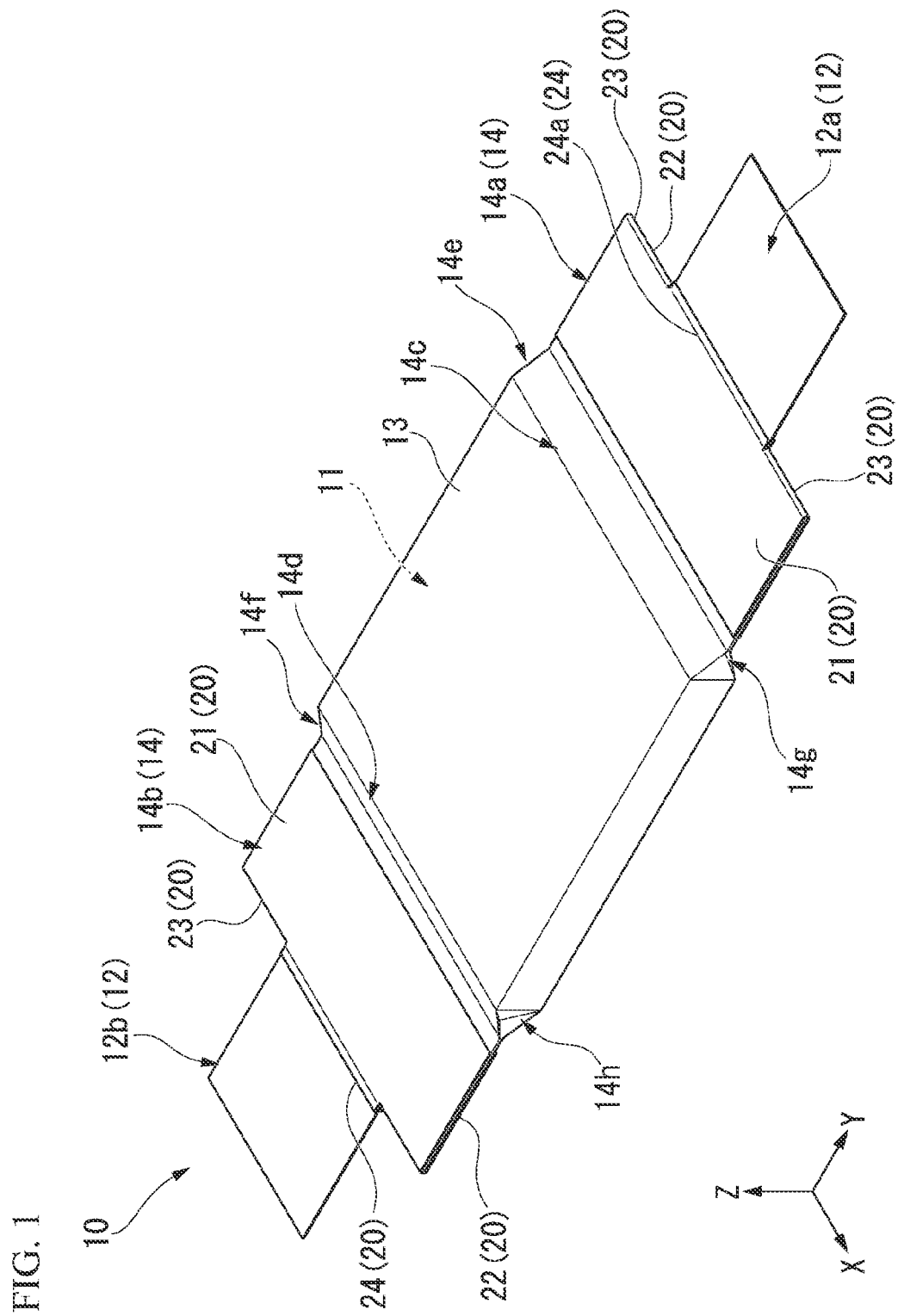
FIG. 1 is a perspective view illustrating a pouch cell according to a first embodiment of the present invention.
Figure 2:
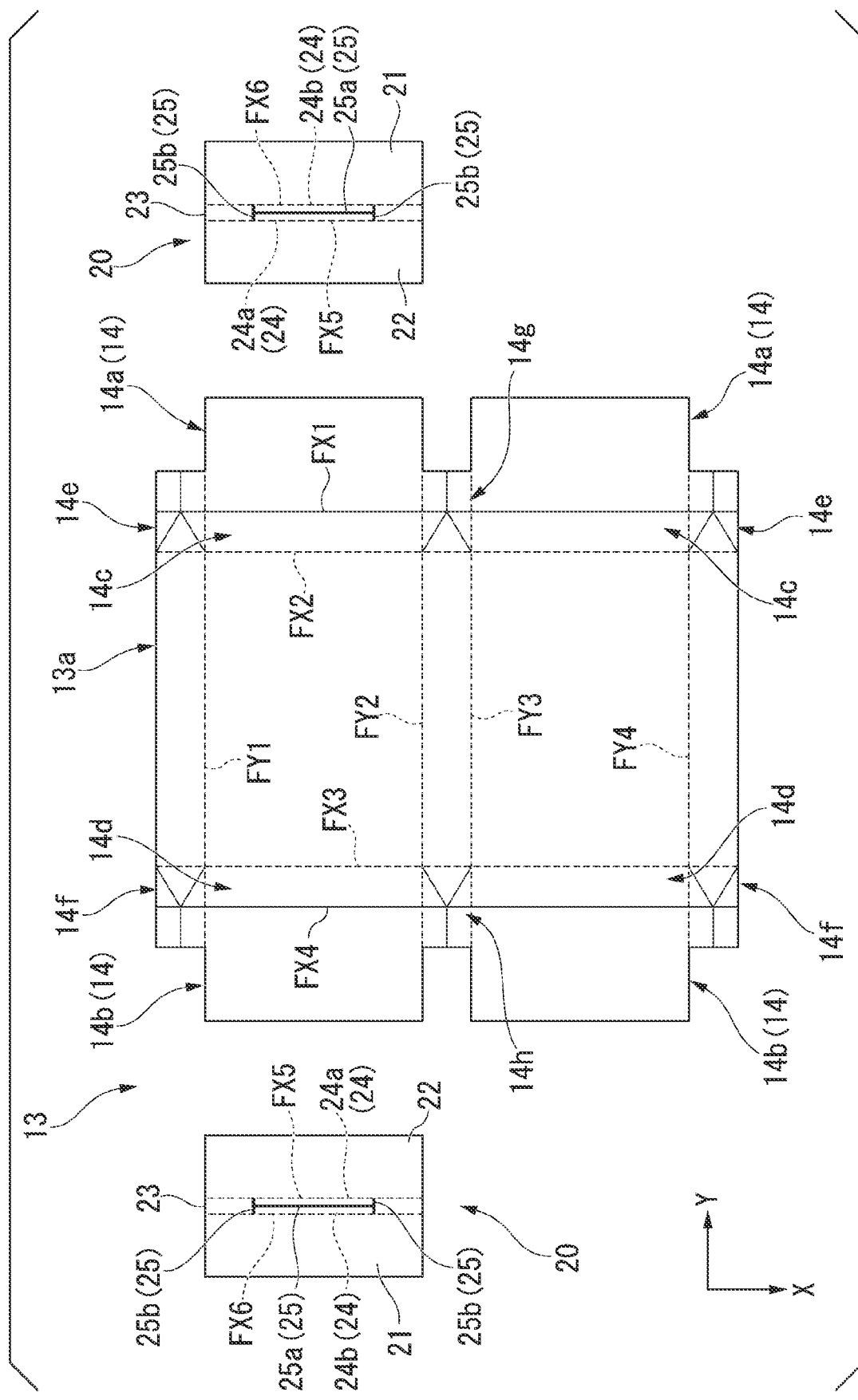
FIG. 2 is a developed view illustrating an exterior film and an airtightness maintaining member forming the pouch cell according to the first embodiment.
Figure 3:
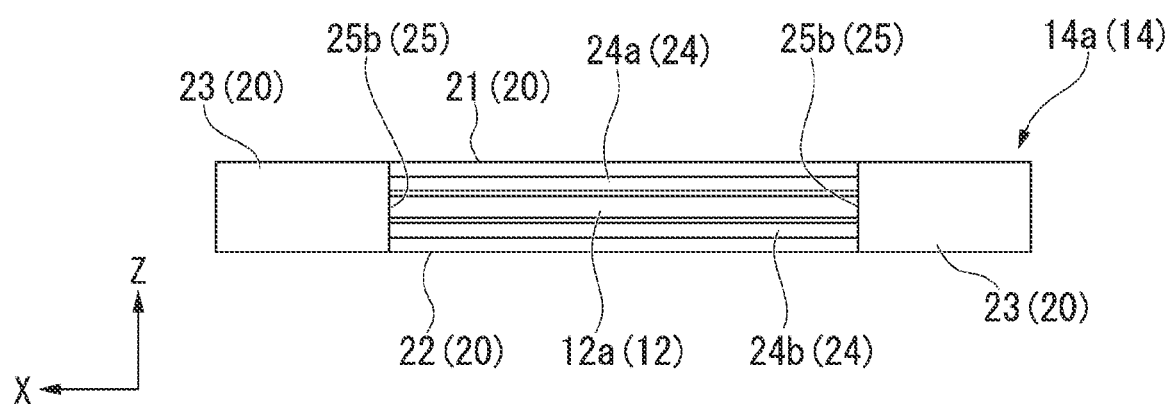
FIG. 3 is an end surface view illustrating an end surface of a clamping part in the pouch cell according to the first embodiment.

FIG. 1 is a perspective view illustrating a pouch cell in the present embodiment. FIG. 2 is a developed view illustrating an exterior film and an airtightness maintaining member of the pouch cell in the present embodiment. FIG. 3 is an end surface view illustrating an end portion of a clamping part in the pouch cell of the present embodiment. In the drawing, a reference numeral 10 is the pouch cell.

As illustrated in FIG. 1, the pouch cell 10 according to the present embodiment includes a charging and discharging element 11, a current collecting tab lead 12, an exterior film 13, and an airtightness maintaining member 20.

The pouch cell 10 is a battery cell. This battery may be a liquid-based battery cell using an organic electrolytic solution as an electrolyte, a battery cell having a gel-like electrolyte, or a solid-state battery cell with a flame-retardant solid electrolyte as an electrolyte instead of the electrolyte of the organic electrolytic solution. Hereinafter, a solid-state battery cell with a solid electrolyte as a battery cell will be described as an example.

The charging and discharging element 11 is a laminated body in which a positive electrode layer and a negative electrode layer are laminated, and a solid electrolyte layer is disposed between the positive electrode layer and the negative electrode layer. "Laminating" means that listed layers are laminated, and can include not only that the layers are directly laminated but also that the layers are indirectly laminated. For example, another layer or the like may be provided between the positive electrode layer and the solid electrolyte layer.

The charging and discharging element 11 is covered with the exterior film 13.

The charging and discharging element 11 is formed in a substantially rectangular parallelepiped. As illustrated in FIG. 1, the charging and discharging element 11 has a plate shape in which a thickness dimension in a Z direction is smaller than those in an X direction and a Y direction. In the charging and discharging element 11, a longitudinal direction thereof is the Y direction and a transverse direction is the X direction when seen in the Z direction. The X direction, Y direction, and Z direction are illustrated for convenience.

In the charging and discharging element 11, a plurality of current collecting tabs extend from an end portion thereof in the Y direction, and the current collecting tab leads 12 connected to the current collecting tabs are further drawn out in the Y direction.

The current collecting tab lead 12 includes two leads including a current collecting tab lead 12a and a current collecting tab lead 12b drawn out of end portions of the charging and discharging element 11 in the Y direction.

The current collecting tab lead 12a is drawn out of the right end portion of the charging and discharging element 11 in the Y direction in FIG. 1. The current collecting tab lead 12b is drawn out of the left end portion of the charging and discharging element 11 in the Y direction in FIG. 1.

The current collecting tab lead 12a and the current collecting tab lead 12b are drawn out of the charging and discharging element 11 in opposite directions following the Y direction. The current collecting tab lead 12a and the current collecting tab lead 12b extend in the Y direction. The current collecting tab lead 12a and the current collecting tab lead 12b are connected to the charging and discharging element 11. End portions of the current collecting tab lead 12a and the current collecting tab lead 12b on the side opposite to the charging and discharging element 11 side are exposed from the exterior film 13. Both the current collecting tab lead 12a and the current collecting tab lead 12b have a small thickness dimension in the Z direction and are formed in a thin shape which is flat in the X and Y directions. Both the current collecting tab lead 12a and the current collecting tab lead 12b are connected to the vicinity of the center of the charging and discharging element 11 in the X direction.

Both the current collecting tab lead 12a and the current collecting tab lead 12b have a thickness dimension in the Z direction smaller than the thickness dimension of the charging and discharging element 11 in the Z direction. Both the current collecting tab lead 12a and the current collecting tab lead 12b have the length in the X direction smaller than the length of the charging and discharging element 11 in the X direction.

In both the current collecting tab lead 12a and the current collecting tab lead 12b, portions thereof close to the charging and discharging element 11 in the Y direction are covered with the exterior film 13.

As illustrated in FIG. 1, the exterior film 13 is wound around the charging and discharging element 11 in a tubular shape and is attached and bonded. The exterior film 13 extends outward so that both ends thereof in the Y direction are further separated from the charging and discharging element 11, and sandwiches the current collecting tab lead 12a and the current collecting tab lead 12b from front and back surfaces thereof in the Z direction. The thickness of the exterior film 13 is reduced to be formed in a triangular prism shape from the charging and discharging element 11 toward the current collecting tab lead 12a and the current collecting tab lead 12b at boundaries at which the thickness of a portion sandwiching the charging and discharging element 11 and the thickness of each portions sandwiching the current collecting tab lead 12a and the current collecting tab lead 12b are different. In this triangular prism part, gusset parts of the exterior film 13 at both ends in the X direction are folded inward. The exterior film 13 seals the charging and discharging element 11.

As illustrated in FIG. 2, the exterior film 13 is a single pouch film. The exterior film 13 is wound on the charging and discharging element 11 around an axis in the Y direction. The exterior film 13 is in close contact with the charging and discharging element 11 except for both end portions thereof in the Y direction.

The exterior film 13 is not particularly limited as long as it is a film that can accommodate and seal the charging and discharging element 11. The exterior film 13 can be preferably a film that can impart airtightness to the pouch cell 10.

The exterior film 13 may include, for example, a barrier layer made of an inorganic thin film such as a metal foil made of aluminum, nickel, stainless steel, or the like. Airtightness can be imparted to the exterior film 13 by providing the barrier layer. The exterior film 13 can include a sealing layer preferably made of a flexible resin such as a polyethylene resin. The exterior film 13 can be joined by welding the laminated sealing layers to face each other. Therefore, a process of applying an adhesive becomes unnecessary.

The exterior film 13 does not have to have the sealing layer. In this case, the pouch cell 10 can also be formed by joining the exterior films 13 to each other with an adhesive.

For example, the exterior film 13 may be a laminated body in which a base material layer made of polyethylene terephthalate, polyethylene naphthalate, nylon, polypropylene, or the like, the above barrier layer, and the above sealing layer are laminated. These layers may be laminated via a conventionally known adhesive, or may be laminated by an extrusion coating method or the like.

A preferable thickness of the exterior film 13 also differs according to the material. The thickness of the exterior film 13 can be preferably 50 μm or more, and more preferably 100 μm or more. The thickness of the exterior film 13 can be preferably 700 μm or less, and more preferably 200 μm or less.

The exterior film 13 may be a single-layer film or a film in which a plurality of layers are laminated. The exterior film 13 in the present embodiment may be a single film that accommodates and seals the charging and discharging element 11 by itself.

The exterior film 13 is welded to the front and back surfaces of the current collecting tab lead 12a and the current collecting tab lead 12b in the Z direction at a position outside the charging and discharging element 11 in the Y direction and separated from the charging and discharging element 11 in the Y direction. In the exterior film 13, a clamping part 14 is formed outside the charging and discharging element 11 in the Y direction.

As illustrated in FIG. 1, the clamping part 14 includes a clamping part 14a that clamps the current collecting tab lead 12a and a clamping part 14b that clamps the current collecting tab lead 12b.

Both the clamping part 14a and the clamping part 14b extend in the Y direction. The clamping part 14a and the clamping part 14b extend symmetrically from the center of the charging and discharging element 11 in the Y direction. The length of each of the clamping part 14a and the clamping part 14b in the X direction is substantially the same as the length of the charging and discharging element 11 in the X direction.

The current collecting tab lead 12a and the current collecting tab lead 12b are exposed from outer end portions of the clamping part 14a and the clamping part 14b in the Y direction.

In the clamping part 14a and the clamping part 14b, the current collecting tab lead 12a and the current collecting tab lead 12b are located at central portions in the X direction. In the clamping part 14a and the clamping part 14b, the exterior film 13 is directly bonded to both end portions in the X direction.

The clamping part 14a and the clamping part 14b have a substantially rectangular contour when seen in the Z direction.

As illustrated in FIGS. 1 and 2, the exterior film 13 is continuous so that the sides approaching the charging and discharging element 11 in the Y direction from the clamping part 14a and the clamping part 14b increase up to a thickness dimension of the charging and discharging element 11 in the Z direction. In the exterior film 13, the sides closer to the charging and discharging element 11 in the Y direction than the clamping part 14a and the clamping part 14b form a triangular prism part 14c and a triangular prism part 14d corresponding to the increase in the thickness dimension from the clamping part 14a and the clamping part 14b to the charging and discharging element 11.

In the triangular prism part 14c and the triangular prism part 14d, both end portions in the X direction are folded inward to form gusset parts 14e to 14h as illustrated in FIGS. 1 and 2. As illustrated in FIG. 2, the exterior film 13 forming the gusset parts 14e to 14h is folded in the Z direction and extends to the outside in the Y direction in a direction away from the charging and discharging element 11. The exterior film 13 forming the gusset parts 14e to 14h extends in the Y direction halfway on each of the clamping parts 14a and the clamping parts 14b. End portions of the exterior film 13 in the Y direction which form the gusset parts 14e to 14h are clamped on the clamping part 14a and the clamping part 14b.

The airtightness maintaining member 20 is welded from front surfaces of the clamping part 14a and the clamping part 14b in the Z direction to back surfaces thereof in the Z direction via the end portion in the Y direction.

The airtightness maintaining member 20 has a configuration symmetrical with respect to the clamping part 14a and the clamping part 14b in the Y direction and is attached in substantially the same shape and state.

Hereinafter, the airtightness maintaining member 20 attached to the clamping part 14a will be described, but the airtightness maintaining member 20 attached to the clamping part 14b also has the same configuration.

As illustrated in FIGS. 1 and 2, the airtightness maintaining member 20 has a rectangular contour and is formed of a single film having the same material and composition as the exterior film 13.

As illustrated in FIGS. 1 to 3, the airtightness maintaining member 20 has a front reinforcing part 21, a back reinforcing part 22, a bent part 23, an extending part 24, and a slit 25.

The front reinforcing part 21 and the back reinforcing part 22 extend on both sides of the bent part 23 with the bent part 23 interposed therebetween.

The front reinforcing part 21 and the back reinforcing part 22 have contour shapes substantially the same as those of the clamping part 14a when seen in the Z direction. The lengths of the front reinforcing part 21 and the back reinforcing part 22 in the X direction are substantially the same as the length of the clamping part 14a in the X direction.

The front reinforcing part 21 is attached to the exterior film 13 on the front surface of the clamping part 14a in the Z direction. The front reinforcing part 21 is attached to almost the entire front surface of the clamping part 14a in the Z direction. The back reinforcing part 22 is attached to the exterior film 13 on the back surface of the clamping part 14a in the Z direction. The back reinforcing part 22 is attached to almost the entire back surface of the clamping part 14a in the Z direction.

The bent part 23 is attached to the end portion of the clamping part 14a in the Y direction. An upper end of the bent part 23 in the Z direction is connected to the front reinforcing part 21. A lower end of the bent part 23 in the Z direction is connected to the back reinforcing part 22. The bent part 23 is located on both outer sides of the current collecting tab lead 12a located at a central position in the X direction at the end portion of the clamping part 14a in the Y direction. In the X direction, the bent part 23 covers both outer sides of the current collecting tab lead 12a located at the center of the end portion of the clamping part 14a in the Y direction. The length of the bent part 23 in the Z direction is substantially the same as the length in the Z direction at the end portion of the clamping part 14a in the Y direction.

The extending part 24 includes an extending part 24a, which is connected to the front reinforcing part 21, on the front side in the Z direction, and an extending part 24b, which is connected to the back reinforcing part 22, on the back side in the Z direction. The sum of lengths of the extending part 24a and the extending part 24b in the Y direction or the Z direction is equal to a length of the bent part 23 in the Z direction.

An end portion of the extending part 24a on the side close to the charging and discharging element 11 in the Y direction is connected to the front reinforcing part 21. The extending part 24a is located between the bent parts 23 located on both outer sides in the X direction. The extending part 24a is located at the center in the X direction at the end portion of the clamping part 14a in the Y direction. The length of the extending part 24a in the X direction corresponds to the length of the current collecting tab lead 12a in the X direction. The extending part 24a extends from a position on the front side in the Z direction with respect to the current collecting tab lead 12a at the end portion of the clamping part 14a in the Y direction to the front surface of the current collecting tab lead 12a in the Z direction. The extending part 24a covers the front surface of the current collecting tab lead 12a in the Z direction from the position on the front side in the Z direction with respect to the current collecting tab lead 12a at the end portion of the clamping part 14a in the Y direction.

The end portion of the extending part 24b on the side close to the charging and discharging element 11 in the Y direction is connected to the back reinforcing part 22. The extending part 24b is located between the bent parts 23 located on both outer sides in the X direction. The extending part 24b is located at the center in the X direction at the end portion of the clamping part 14a in the Y direction. The length of the extending part 24b in the X direction corresponds to the length of the current collecting tab lead 12a in the X direction. The extending part 24b extends from a position on the back side in the Z direction with respect to the current collecting tab lead 12a at the end portion of the clamping part 14a in the Y direction to the back surface of the current collecting tab lead 12a in the Z direction. The extending part 24b covers the back surface of the current collecting tab lead 12a in the Z direction from the position on the back side in the Z direction with respect to the current collecting tab lead 12a at the end portion of the clamping part 14a in the Y direction.

The slit 25 includes a central slit 25a which extends in the X direction along the front surface of the current collecting tab lead 12a in the Z direction illustrated in FIG. 1 and through which the current collecting tab lead 12a passes, and an end slit 25b which is orthogonal to the central slit 25a and extends in the Z direction illustrated in FIG. 1. The central slit 25a is formed at the central position in the X direction sandwiched between the two bent parts 23.

The end slits 25b are respectively formed at both end portions of the central slit 25a.

The end slits 25b extend to a boundary position between the bent parts 23 and the front reinforcing part 21 and the back reinforcing part 22.

In the pouch cell 10 of the present embodiment, the end portion of the clamping part 14a in the Y direction is sealed by the airtightness maintaining member 20 except for the current collecting tab lead 12a, as illustrated in FIGS. 1 to 3.

That is, in the end portion of the clamping part 14a in the Y direction, the bent parts 23 seal positions on both outer sides of the current collecting tab lead 12a located at the central position in the X direction. The bent parts 23 seal the entire length in the Z direction at the end portion of the clamping part 14a in the Y direction.

In the end portion of the clamping part 14a in the Y direction, the extending part 24a seals a position above the current collecting tab lead 12a near the center in the Z direction. In the end portion of the clamping part 14a in the Y direction, the extending part 24b seals a position below the current collecting tab lead 12a near the center in the Z direction.

Thereby, the airtightness at the end portion of the clamping part 14a can be improved.

Further, the periphery of the charging and discharging element 11 is sealed by the exterior film 13. Therefore, the airtightness of the pouch cell 10 can be improved. At the same time, the strength and rigidity of the clamping part 14a can be improved by welding the front reinforcing part 21 and the back reinforcing part 22 of the airtightness maintaining member 20 to the flat front and back surfaces of the clamping part 14a. Therefore, in the pouch cell 10, a portion at which the current collecting tab lead 12a is provided can be reinforced.

At the same time, the strength and rigidity of the clamping part 14a can be improved by covering the front and back surfaces of the clamping part 14a in the Z direction from the end portion side in the Y direction with the airtightness maintaining member 20 which is a single film.

The same applies to the clamping part 14b.

Hereinafter, a method for manufacturing the pouch cell 10 will be described.

Figure 4:
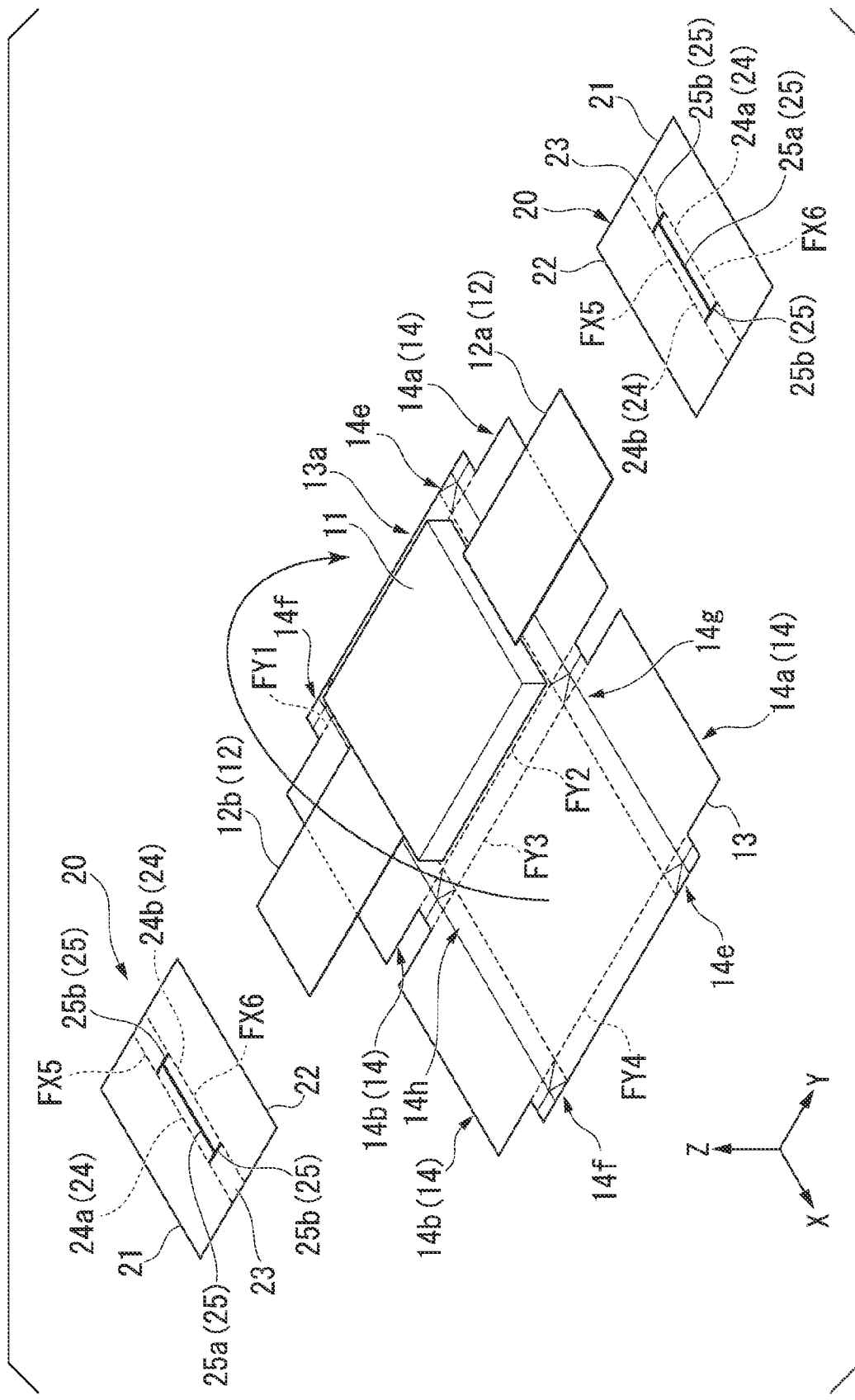
FIG. 4 is a process diagram illustrating a coating process with the exterior film and the airtightness maintaining member in the pouch cell according to the first embodiment.
Figure 5:
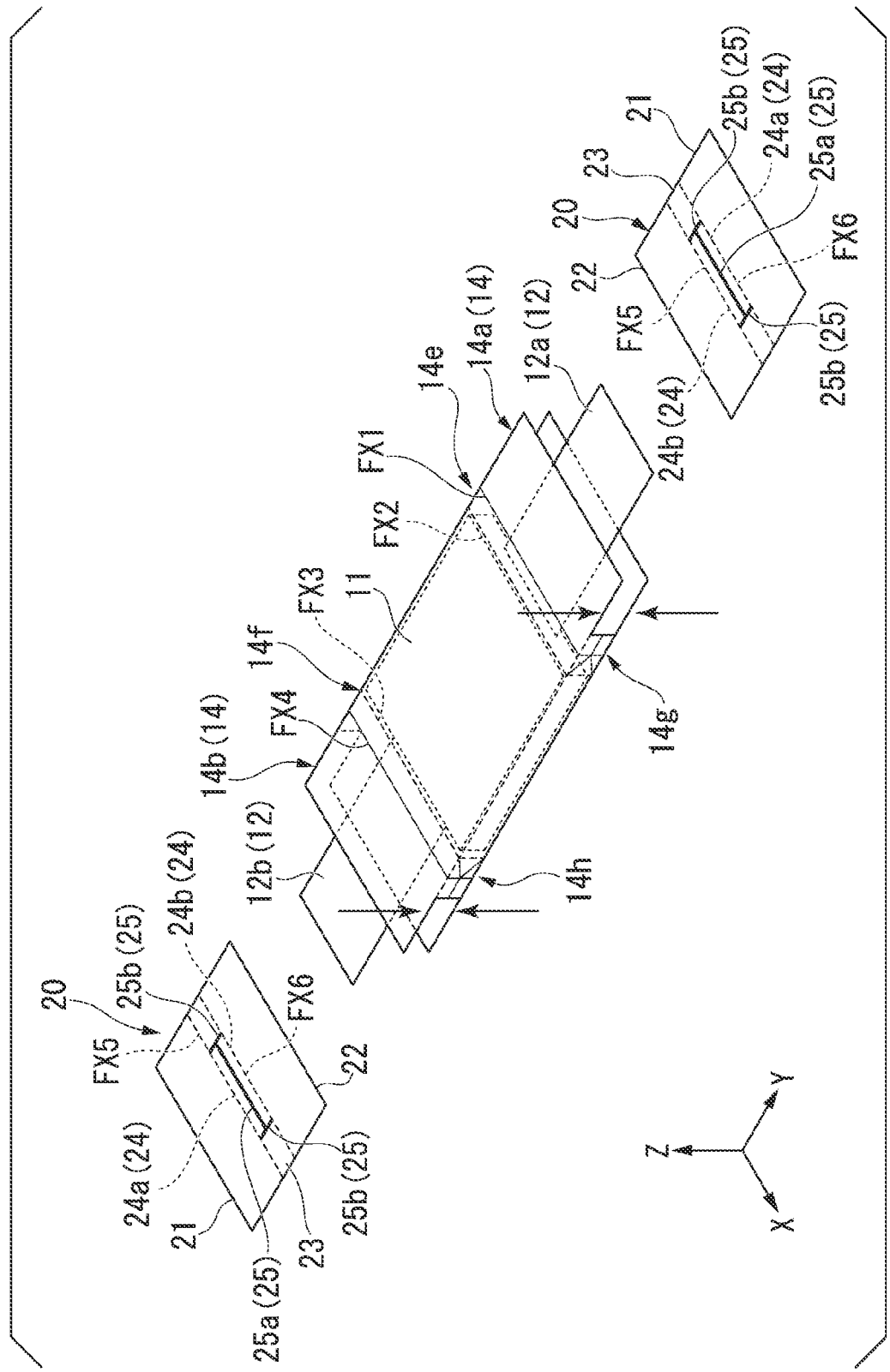
FIG. 5 is a process diagram illustrating the coating process with the exterior film and the airtightness maintaining member in the pouch cell according to the first embodiment.
Figure 6:
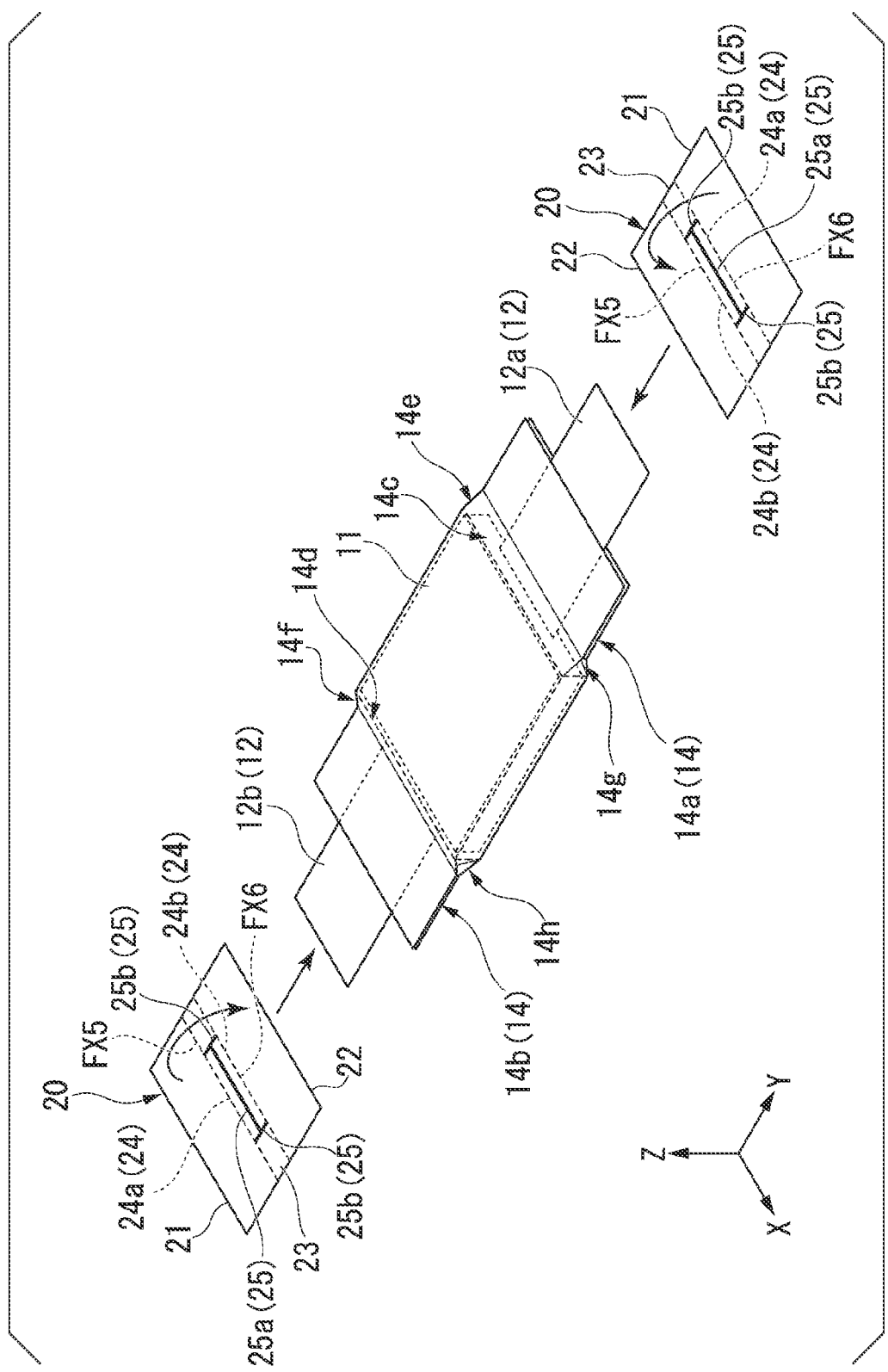
FIG. 6 is a process diagram illustrating the coating process with the exterior film and the airtightness maintaining member in the pouch cell according to the first embodiment.
Figure 7:
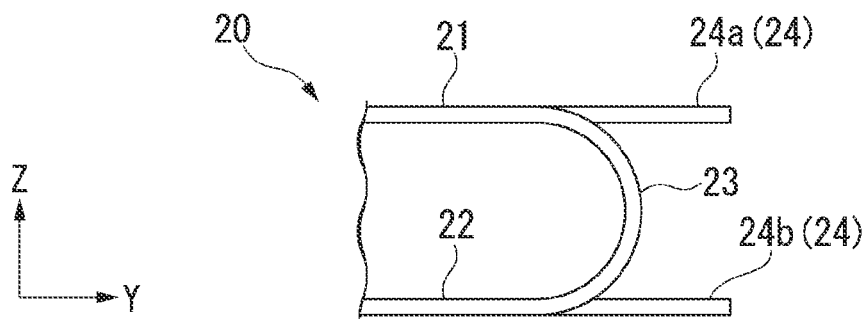
FIG. 7 is a process diagram illustrating the airtightness maintaining member in the coating process of the pouch cell according to the first embodiment.

FIGS. 4 to 6 are process diagrams illustrating a coating process of the pouch cell with the external film and the airtightness maintaining member in the present embodiment. FIG. 7 is a process diagram illustrating the airtightness maintaining member in the coating process of the pouch cell in the present embodiment.

In the present embodiment, the pouch cell is formed by placing the charging and discharging element 11 on the exterior film 13 on which a folding line is formed and folding the exterior film 13 to be sealed in a tubular shape.

First, as illustrated in FIG. 2, a plurality of parallel folding lines FX1 to FX4 which follow the X direction and a plurality of parallel folding lines FY1 to FY4 which follow the Y direction are formed on the exterior film 13. The folding lines FX1 to FX4 and the folding lines FY1 to FY4 are both formed in a straight line. Further, diagonal folding lines which do not follow the X direction and the Y direction are formed in the gusset part 14e, the gusset part 14f, the gusset part 14g, and the gusset part 14h.

The folding line FX1 is formed at a boundary position between the clamping part 14a and the triangular prism part 14c. The folding line FX2 is formed at a boundary position between the triangular prism part 14c and a central portion 13a surrounding the charging and discharging element 11. The folding line FX3 is formed at a boundary position between the central portion 13a surrounding the charging and discharging element 11 and the triangular prism part 14d. The folding line FX4 is formed at a boundary position between the triangular prism part 14d and the clamping part 14b.

The folding line FY1 is formed at a boundary position between the clamping part 14a on the front surface side and the gusset part 14e and a boundary position between the clamping part 14b on the surface side and the gusset part 14f. The folding line FY2 is formed at a boundary position between the clamping part 14a on the front surface side and the gusset part 14g and at a boundary position between the clamping part 14b on the front surface side and the gusset part 14h.

The folding line FY3 is formed at a boundary position between the clamping part 14a on the back surface side and the gusset part 14g and at a boundary position between the clamping part 14b on the back surface side and the gusset part 14h. The folding line FY4 is formed at a boundary position between the clamping part 14a on the back surface side and the gusset part 14e to be overlapped and bonded and a boundary position between the clamping part 14b on the back surface side and the gusset part 14f to be overlapped and bonded.

The folding lines FX1 to FY4 are formed on the exterior film 13 by, for example, a method such as embossing or drawing. The folding lines FX1 to FY4 are created according to the shape and size of the charging and discharging element 11 and the current collecting tab lead 12 accommodated in the exterior film 13.

As illustrated in FIG. 2, a plurality of parallel folding lines FX5 and folding lines FX6 which follow the X direction are formed on the airtightness maintaining member 20. Further, the slit 25 is formed in the airtightness maintaining member 20.

The folding line FX5 is formed at a boundary position between the back reinforcing part 22 and the bent part 23. The folding line FX6 is formed at a boundary position between the bent part 23 and the front reinforcing part 21. The folding line FX5 and the folding line FX6 are formed over the entire length of the airtightness maintaining member 20 in the X direction.

The slit 25 includes the central slit 25a which extends in the X direction parallel to the folding line FX5 and the folding line FX6, and the end slit 25b which is orthogonal to the central slit 25a and extends in the Y direction. The central slit 25a is formed at the central position in the X direction.

The end slits 25b are formed at both end portions of the central slit 25a.

The end slits 25b extend over the entire length of the bent part 23 in the Y direction. Both ends of the end slits 25b are respectively connected to the folding line FX5 and the folding line FX6.

The slit 25 is formed to have, for example, a substantially H shape.

As will be described later, the slit 25 is not limited to the H shape as long as it has a shape that allows the current collecting tab lead 12 to pass therethrough and can be in close contact with the end portion of the clamping part 14 in the Y direction. As will be described later, a width of the end slit 25b may be widened and formed to have a rectangular shape, or the end slit 25b may be formed to have a circular shape or the like.

The folding line FX5 and the folding line FX6 are formed on the airtightness maintaining member 20 similarly to the exterior film 13 by, for example, a method such as embossing or drawing. The folding line FX5 and the folding line FX6 are created according to the shape and size of the clamping part 14 and the current collecting tab lead 12.

The slit 25 is formed in the airtightness maintaining member 20 which is a single film using an H-shaped cutting blade. Alternatively, the slit 25 is formed as an H-shaped notch in the airtightness maintaining member 20.

As illustrated in FIG. 4, the charging and discharging element 11 to which the current collecting tab lead 12a and the current collecting tab lead 12b are connected is placed on the central portion 13a on the exterior film 13 on which the folding lines are formed as described above.

Next, all the folding lines FY1 to FY4 which extend in the Y direction are folded back to form valley folds as illustrated by arrows in FIG. 4. Thus, as illustrated in FIG. 5, the exterior film 13 is wound to surround the charging and discharging element 11. Then, the gusset part 14e, the gusset part 14f, and a portion sandwiched between the gusset part 14e and the gusset part 14f on the inner side in FIG. 5 are overlapped and welded. As a result, the exterior film 13 has a tubular shape.

Next, the folding line FX2 and the folding line FX3 extending in the X direction are folded to form mountain folds, the folding line FX1 and the folding line FX4 extending in the X direction are folded to form valley folds, and as illustrated by an arrow in FIG. 5, portions which become the clamping part 14a and the clamping part 14b located outside the charging and discharging element 11 in the Y direction are brought into close contact with each other in the Z direction to overlap each other. At this time, the gusset parts 14e to 14h are all folded inward in the X direction. Then, the portions which become the clamping part 14a and the clamping part 14b are overlapped and welded together with the current collecting tab lead 12a and the current collecting tab lead 12b.

Thus, the triangular prism part 14c, the clamping part 14a which extends outward of the triangular prism part 14c in the Y direction, the triangular prism part 14d and the clamping part 14b which extending outward of the triangular prism part 14d in the Y direction are formed respectively, as illustrated in FIG. 6.

Next, the airtightness maintaining member 20 illustrated on the outer side of the exterior film 13 in the Y direction in FIG. 6 is folded along the folding lines FX5 and FX6 extending in the X direction to form a valley fold as illustrated by arrows in FIG. 6. Thus, as illustrated in FIG. 7, the airtightness maintaining member 20 is in a state in which the front reinforcing part 21 and the back reinforcing part 22 are separated from each other along planes extending in the X direction and the Y direction. At this time, the bent parts 23 extend along planes extending in the X direction and the Z direction. Further, the extending part 24 extends along the planes extending in the X direction and the Y direction. As a result, the central slit 25a is widened.

Further, the current collecting tab lead 12a passes through the slit 25 of the airtightness maintaining member 20. Then, the front reinforcing part 21 is brought into contact with the front surface of the clamping part 14a in the Z direction and the upper side of the end surface of the clamping part 14a in the Y direction. At the same time, the back reinforcing part 22 is brought into contact with the back surface of the clamping part 14a in the Z direction. At the same time, the bent parts 23 are brought into contact with the end portion of the clamping part 14a in the Y direction.

In addition, the proximal end side of the extending part 24a which is close to the charging and discharging element 11 in the Y direction is brought into contact with the front surface of the clamping part 14a in the Z direction. Further, the distal end side of the extending part 24a in the Y direction is brought into contact with the front surface of the current collecting tab lead 12a in the Z direction which is located outside the end portion of the clamping part 14a in the Y direction.

Similarly, the proximal end side of the extending part 24b which is close to the charging and discharging element 11 in the Y direction is brought into contact with the back surface of the clamping part 14a in the Z direction and the lower side of the end surface of the clamping part 14a in the Y direction. Further, the distal end side of the extending part 24b in the Y direction is brought into contact with the back surface of the current collecting tab lead 12a in the Z direction which is located outside the end portion of the clamping part 14a in the Y direction.

Further, the front reinforcing part 21 is welded to the front surface of the clamping part 14a in the Z direction. At the same time, the back reinforcing part 22 is welded to the back surface of the clamping part 14a in the Z direction. At the same time, the bent part 23 is welded to the end portion of the clamping part 14a in the Y direction.

In addition, the proximal end side of the extending part 24a which is close to the charging and discharging element 11 in the Y direction is welded to the front surface of the clamping part 14a in the Z direction and the upper side of the end surface of the clamping part 14a in the Y direction. Further, the distal end side of the extending part 24a in the Y direction is contact welded to the front surface of the current collecting tab lead 12a in the Z direction which is located outside the end portion of the clamping part 14a in the Y direction.

Similarly, the proximal end side of the extending part 24b which is close to the charging and discharging element 11 in the Y direction is welded to the back surface of the clamping part 14a in the Z direction and the lower side of the end surface of the clamping part 14b in the Y direction. Further, the distal end side of the extending part 24b in the Y direction is contact welded to the back surface of the current collecting tab lead 12a in the Z direction which is located outside the end portion of the clamping part 14a in the Y direction.

As a result, the airtightness maintaining member 20 is attached to the clamping part 14a and the current collecting tab lead 12a.

Similarly, the airtightness maintaining member 20 is brought into close contact with and attached to the current collecting tab lead 12b which have passed through the slit 25 and the clamping part 14b. Thus, as illustrated in FIG. 1, the pouch cell 10 is manufactured.

The process and work order of deformation, contact, welding, and the like of the airtightness maintaining member 20 are not limited to the above-described order. For example, after the back reinforcing part 22 is welded to the back surface of the clamping part 14a in the Z direction, it is also possible to perform the processes such as contacting and welding of the bent part 23 and the front reinforcing part 21, and it is possible to appropriately select the processes according to the ease of the work process and the like.

In the present embodiment, since the airtightness maintaining member 20 can be formed of the same film as the exterior film 13, the airtightness maintaining member 20 can be easily brought into close contact with the current collecting tab lead 12 and the clamping part 14 so that the airtightness can be improved and the rigidity and strength can be improved. In particular, the airtightness maintaining member 20 can prevent peeling-off of the laminated film and the current collecting tab lead 12 generated at the end of the clamping part 14 in the Y direction.

Here, when the length of the attached bent part 23 in the Z direction, that is, the length of the bent part 23 in the Y direction in the developed view is set to be larger than the length of the end slit 25b in the Y direction in the developed view, the airtightness of the end portion of the clamping part 14 in the Y direction can be improved.

Further, when the extending part 24 covers not only the end portion of the clamping part 14 in the Y direction but also the front and back surfaces of the current collecting tab lead 12, a welding length which serves as an air intrusion path can be increased, and the airtightness can be further improved.

Further, when the length of the bent part 23 in Y direction in the developed view is set to be larger than a thickness dimension of the end portion of the clamping part 14 in the Y direction, that is, the length in the Z direction in the end portion of the clamping part 14 in the Y direction, the length of the extending part 24 in the Y direction in the developed view can be lengthened, a welding area is increased, and thus the airtightness can be improved.

Hereinafter, a pouch cell according to a second embodiment of the present invention will be described with reference to the drawings.

Figure 8:
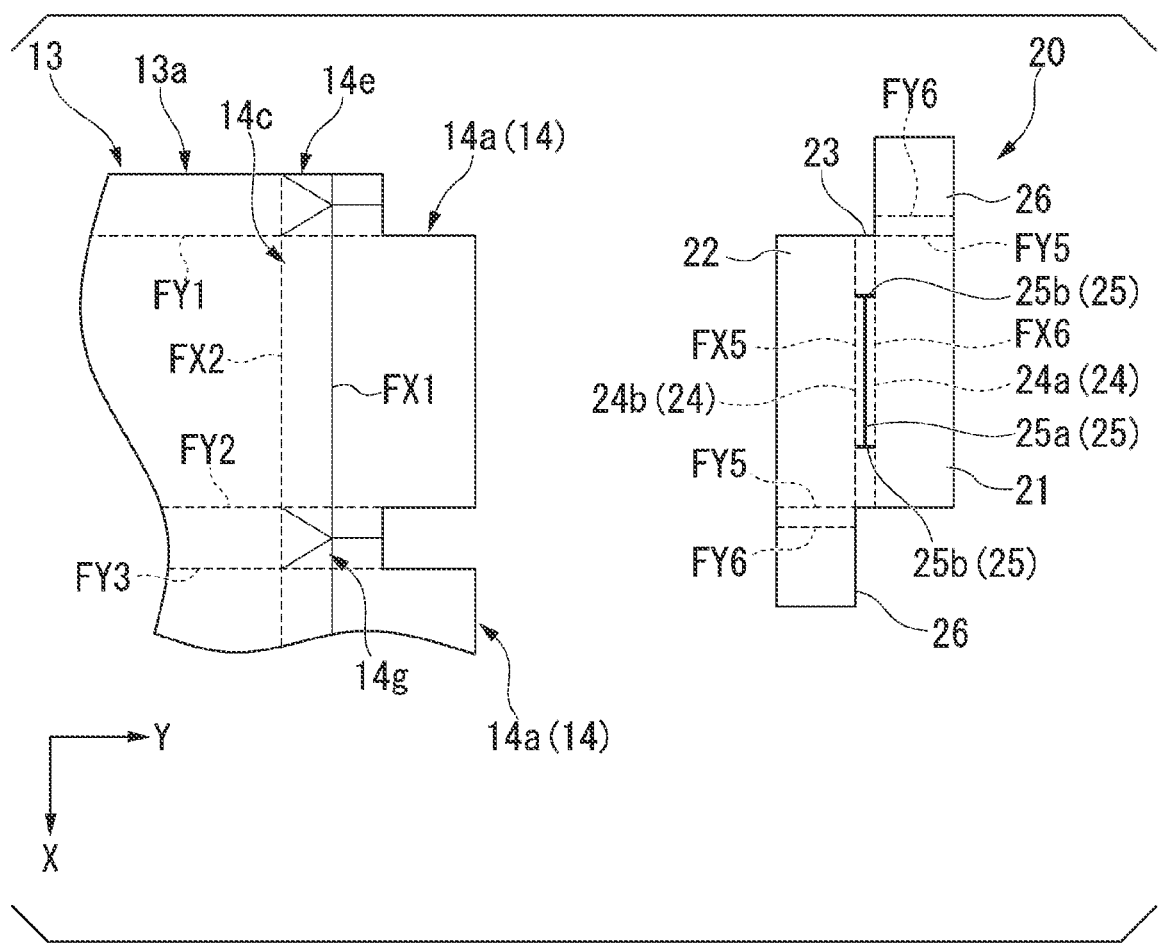
FIG. 8 is a partially developed view illustrating an exterior film and an airtightness maintaining member forming a pouch cell according to a second embodiment of the present invention.

FIG. 8 is a partially enlarged development view illustrating the exterior film of the pouch cell and the airtightness maintaining member in the present embodiment. In the present embodiment, a difference from the first embodiment described above is that a fold reinforcing part is provided, and the same reference numerals are given to the configurations corresponding to those of the first embodiments described above, and a description thereof will be omitted.

In the present embodiment, as illustrated in FIG. 8, the airtightness maintaining member 20 has a fold reinforcing part 26. The fold reinforcing part 26 has a substantially rectangular contour.

The fold reinforcing part 26 is formed so that the contour of the front reinforcing part 21 extends upward in the X direction in the developed view illustrated in FIG. 8. The fold reinforcing part 26 has a folding line FY5 extending in the Y direction as a boundary with the front reinforcing part 21. The fold reinforcing part 26 has a folding line FY6 that is parallel to the folding line FY5 and is separated from the front reinforcing part 21 further than the folding line FY5.

Similarly, in the developed view illustrated in FIG. 8, the fold reinforcing part 26 is formed so that the contour of the back reinforcing part 22 extends downward in the X direction in a direction opposite to the front reinforcing part 21. The fold reinforcing part 26 has the folding line FY5 extending in the Y direction as a boundary with the back reinforcing part 22. The fold reinforcing part 26 has the folding line FY6 that is parallel to the folding line FY5 and is separated from the back reinforcing part 22 further than the folding line FY5.

The fold reinforcing part 26 has the same dimension in the Y direction as that of the front reinforcing part 21 and the back reinforcing part 22.

The length of the fold reinforcing part 26 in the X direction can be longer than a thickness dimension of the clamping part 14 and shorter than the length of the clamping part 14 in the X direction.

When the airtightness maintaining member 20 is attached to the clamping part 14, the fold reinforcing part 26 is folded back in the X direction along the contour of the clamping part 14 by the folding line FY5 so as to form a valley fold. The fold reinforcing part 26 is further folded back in the X direction to have a valley fold by the folding line FY6.

A portion of the fold reinforcing part 26 between the folding line FY5 and the folding line FY6 is welded to the end portion of the clamping part 14a in the X direction.

Further, in the fold reinforcing part 26, a portion separated from the front reinforcing part 21 further than the folding line FY6 is welded to the back surface of the back reinforcing part 22 attached to the back surface of the clamping part 14a in the Y direction. In the fold reinforcing part 26, a portion separated from the back reinforcing part 22 further than the folding line FY6 is welded to the front surface of the front reinforcing part 21 attached to the front surface of the clamping part 14a in the Y direction.

In the airtightness maintaining member 20, the clamping part 14b also has the same configuration as that of the clamping part 14a.

In the present embodiment, each of the fold reinforcing parts 26 is wrapped around the clamping parts 14a from the end portion in the X direction to cover the clamping parts 14a.

That is, the fold reinforcing part 26 of the airtightness maintaining member 20 is formed at a position which is a side portion of the clamping part 14 with respect to a draw-out direction of the current collecting tab lead 12. As a result, the clamping part 14a in the vicinity of the portion in which the thickness increases from the clamping part 14a to the triangular prism part 14c is wound up from a side surface in the X direction, and the fold reinforcing part 26 is welded.

Here, when the clamping part 14 is drawn outward in the Y direction, an external force acts on the vicinity of the triangular prism parts 14c and 14d to separate the front and back surfaces of the triangular prism parts 14c and 14d in the Z direction from each other. The welded portion of the clamping part 14 may be peeled off by the external force, but in the present embodiment, this can be prevented.

Also in the present embodiment, the same effects as those of each of the above-described embodiments can be obtained.

In the present embodiment, the fold reinforcing part 26 is connected to one end portion of each of the front reinforcing part 21 and the back reinforcing part 22 in the X direction, but the present invention is not limited to such a configuration. For example, the fold reinforcing part 26 may be connected to only one of the front reinforcing part 21 and the back reinforcing part 22.

Hereinafter, a pouch cell according to a third embodiment of the present invention will be described with reference to the drawings.

Figure 9:
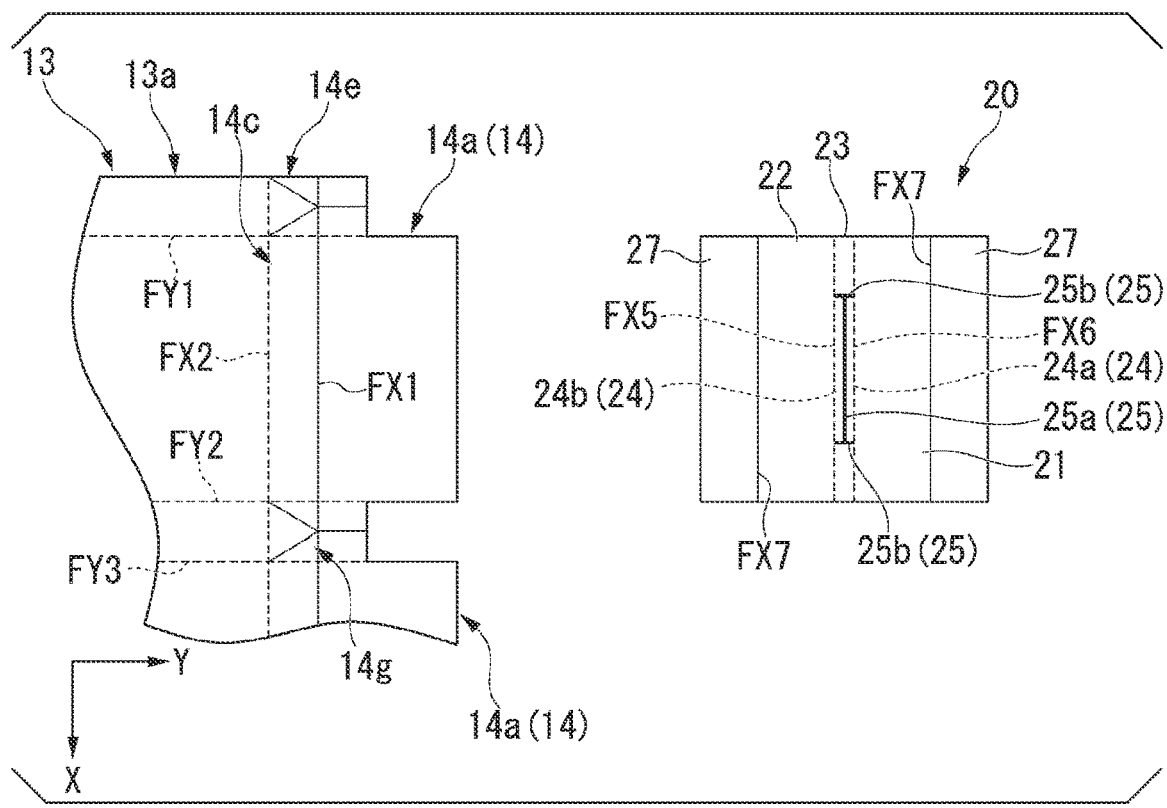
FIG. 9 is a partially developed view illustrating an exterior film and an airtightness maintaining member forming a pouch cell according to a third embodiment of the present invention.

FIG. 9 is a partially enlarged development view illustrating the exterior film and the airtightness maintaining member of the pouch cell in the present embodiment. In the present embodiment, a difference from the first embodiment described above is a point relating to the triangular prism reinforcing part, and the same reference numerals are given to the configurations corresponding to the first embodiment described above, and a description thereof will be omitted.

In the present embodiment, as illustrated in FIG. 9, the airtightness maintaining member 20 has a triangular prism reinforcing part 27. The triangular prism reinforcing part 27 has a substantially rectangular contour.

The triangular prism reinforcing part 27 is formed to extend the contour of the front reinforcing part 21 to the right in the Y direction in the developed view illustrated in FIG. 9. The triangular prism reinforcing part 27 has a folding line FX6 which extends in the X direction as a boundary with the front reinforcing part 21.

Similarly, in the developed view illustrated in FIG. 9, the triangular prism reinforcing part 27 is formed so that the contour of the back reinforcing part 22 extends to the left in the Y direction which is a direction opposite to the front reinforcing part 21. The triangular prism reinforcing part 27 has a folding line FX5 which extends in the X direction as a boundary with the back reinforcing part 22.

The triangular prism reinforcing part 27 has the same dimension in the X direction as that of the front reinforcing part 21 and the back reinforcing part 22. The length of the triangular prism reinforcing part 27 in the Y direction may be substantially the same as the length of the triangular prism part 14c in the Y direction in the developed view, or may be shorter than the length of the triangular prism part 14c in the Y direction.

When the airtightness maintaining member 20 is attached to the clamping part 14, the triangular prism reinforcing part 27 is bent by a folding line FX5 which has a mountain fold. The triangular prism reinforcing part 27 which extends from the front reinforcing part 21 is brought into contact with the front surface of the triangular prism part 14c in the Z direction and then welded thereto. The triangular prism reinforcing part 27 which extends from the back reinforcing part 22 is brought into contact with the back surface of the triangular prism part 14c in the Z direction and then welded thereto. The triangular prism part 14d has the same configuration.

In the present embodiment, since the airtightness maintaining member 20 has the triangular prism reinforcing part 27, the vicinity of the boundary between the triangular prism part 14c and the clamping part 14a which has room for improvement in terms of durability can be covered with and reinforced by the triangular prism reinforcing part 27.

Thus, the triangular prism parts 14c and 14d, in which the current collecting tab lead 12 having a small thickness is drawn out of the charging and discharging element 11 to have a step, need to be reinforced in terms of strength and are required to have rigidity, and such a requirement can be satisfied.

Also in the present embodiment, the same effects as those of each of the above-described embodiments can be obtained.

Hereinafter, a pouch cell according to a fourth embodiment of the present invention will be described with reference to the drawings.

Figure 10:
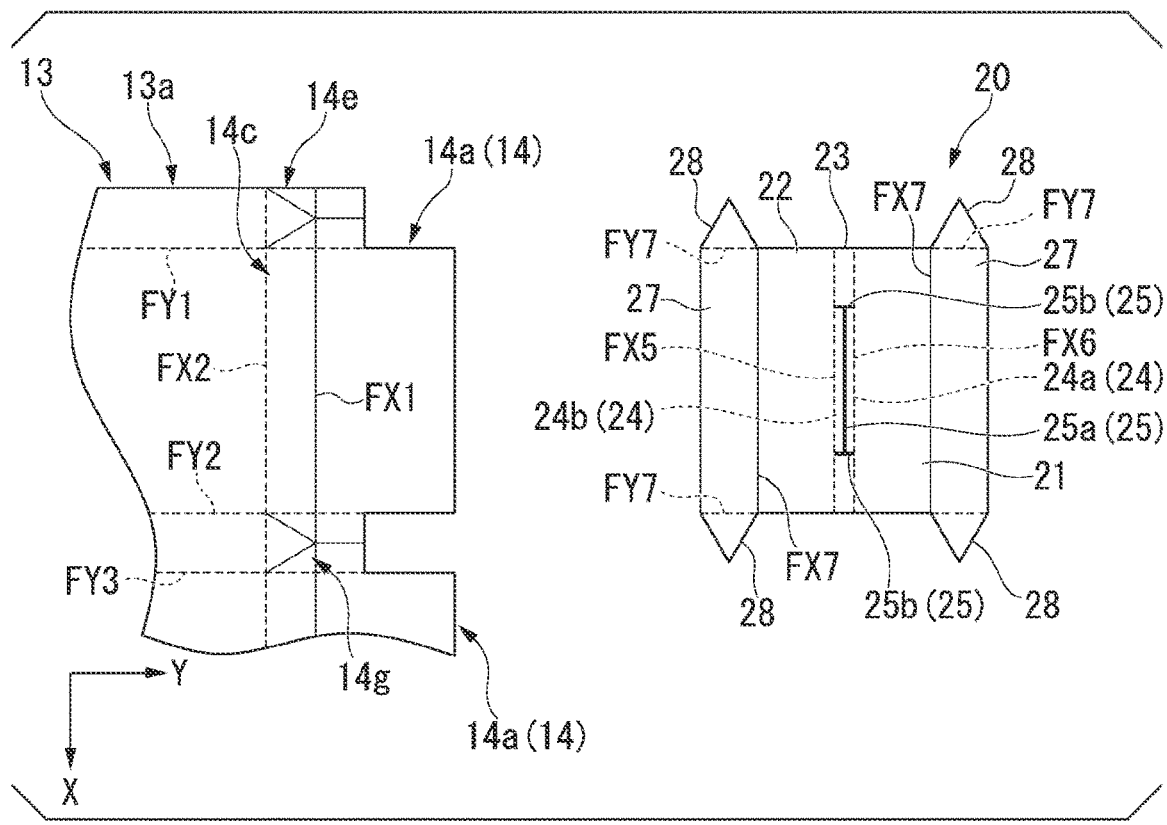
FIG. 10 is a partially developed view illustrating an exterior film and an airtightness maintaining member forming a pouch cell according to a fourth embodiment of the present invention.

FIG. 10 is a partially enlarged development view illustrating the exterior film and the airtightness maintaining member of the pouch cell in the present embodiment. In the present embodiment, a difference from the third embodiment described above is that a second fold reinforcing part is provided, and the same reference numerals are given to the configurations corresponding to the third embodiment described above, and a description thereof will be omitted.

In the present embodiment, as illustrated in FIG. 10, the airtightness maintaining member 20 has a second fold reinforcing part 28.

The second fold reinforcing part 28 in the developed view illustrated in FIG. 10 has a substantially triangular contour.

The second fold reinforcing part 28 is attached to the gusset parts 14e and 14f at a position closer to the charging and discharging element 11 than the clamping part 14a. The contour shape of the second fold reinforcing part 28 corresponds to shapes of the gusset parts 14e and 14f.

The second fold reinforcing part 28 is formed to extend in the X direction with respect to the triangular prism reinforcing part 27 in which the front reinforcing part 21 and the back reinforcing part 22 extend in the developed view illustrated in FIG. 10. The second fold reinforcing part 28 is connected to both ends of the triangular prism reinforcing part 27 in the X direction. The second fold reinforcing part 28 is formed to extend the contour of the triangular prism reinforcing part 27 upward and downward in the X direction. The second fold reinforcing part 28 has a folding line FY7 which extends in the Y direction as a boundary with the triangular prism reinforcing part 27.

The folding line FY7 is formed over the entire length of the end portion of the triangular prism reinforcing part 27 in the X direction in the developed view illustrated in FIG. 10. The folding line FY7 is formed over the entire length of the end portion of the second fold reinforcing part 28 in the X direction in the developed view illustrated in FIG. 10.

The second fold reinforcing part 28 has the same dimension in the Y direction as that of the triangular prism reinforcing part 27 at a position at which it is connected to the triangular prism reinforcing part 27. A shape of the second fold reinforcing part 28 in the X direction may have substantially the same as that of the gusset part 14e and the gusset part 14g folded inward in the X direction.

When the airtightness maintaining member 20 is attached to the clamping part 14, the second fold reinforcing part 28 connected to the back reinforcing part 22 is brought into contact with the gusset part 14e and the gusset part 14g after the triangular prism reinforcing part 27 is brought into contact with a back surface of the triangular prism part 14c in the Z direction. At this time, the second fold reinforcing part 28 is bent from the triangular prism reinforcing part 27 by the folding line FY7 which has a valley fold.

Further, the second fold reinforcing part 28 connected to the front reinforcing part 21 is brought into contact with the front surface of the second fold reinforcing part 28 which is bent and comes into contact with the gusset part 14e and the gusset part 14g after the triangular prism reinforcing part 27 is brought into contact with the front surface of the triangular prism part 14c in the Z direction. At this time, the second fold reinforcing part 28 is similarly bent from the triangular prism reinforcing part 27 on the front side by the folding line FY7 which has a valley fold.

Then, in the overlapped second folded reinforcing part 28, the second fold reinforcing part 28 on the back side is welded to the gusset part 14e and the gusset part 14g, and the second fold reinforcing part 28 on the front side is welded to the second fold reinforcing part 28 on the back side. At this time, the second fold reinforcing part 28 has a contour shape that does not protrude from the gusset part 14e and the gusset part 14g. The triangular prism part 14d has the same configuration.

In the present embodiment, since the airtightness maintaining member 20 has the second fold reinforcing part 28 and they overlap each other, the vicinity of the gusset part 14e and the gusset part 14g in the triangular prism part 14c, which has room for improvement in terms of durability, can be covered with and reinforced by the second fold reinforcing part 28.

Thus, the triangular prism parts 14c and 14d, in which the current collecting tab lead 12 having a small thickness dimension is drawn out of the charging and discharging element 11 to form a step, need to be reinforced in terms of strength and are required to have rigidity, and such a requirement can be satisfied.

Hereinafter, a pouch cell according to a fifth embodiment of the present invention will be described with reference to the drawings.

Figure 11:
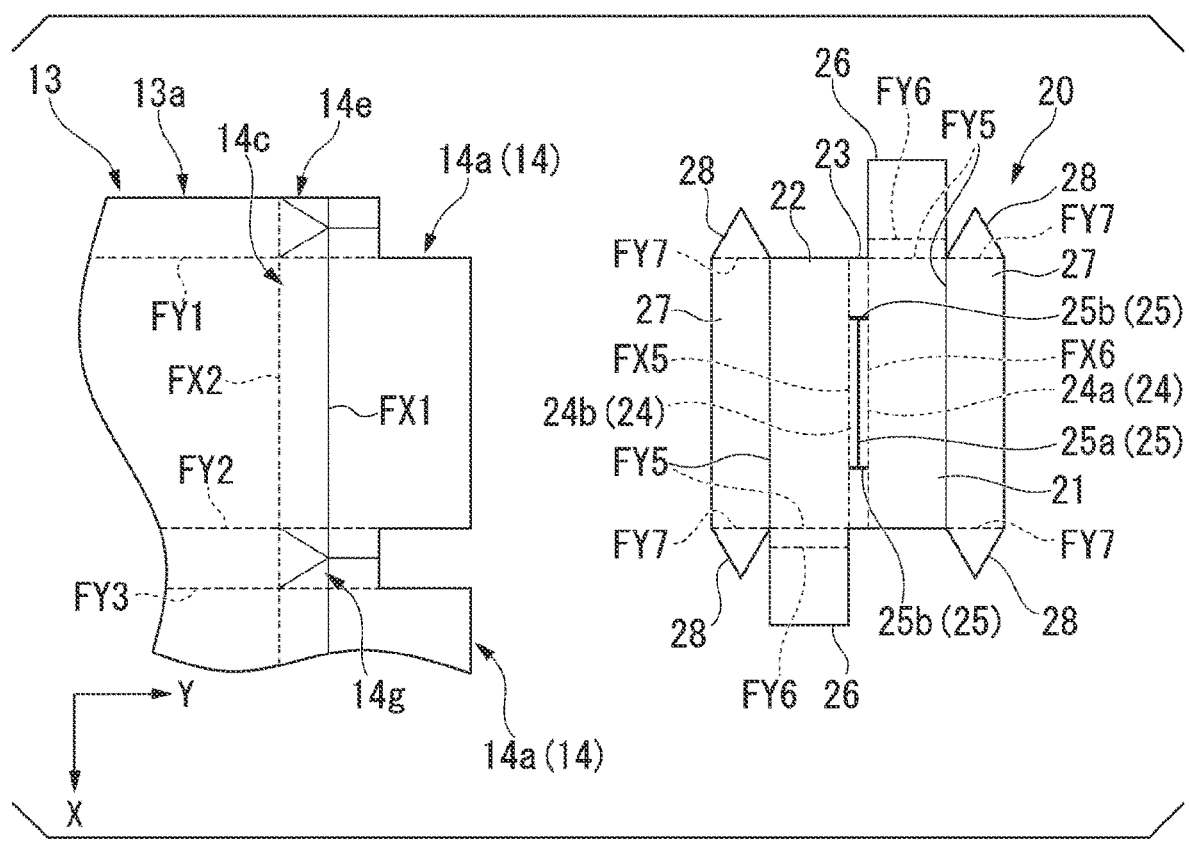
FIG. 11 is a partially developed view illustrating an exterior film and an airtightness maintaining member forming a pouch cell according to a fifth embodiment of the present invention.

FIG. 11 is a partially enlarged development view illustrating the exterior film and the airtightness maintaining member of the pouch cell in the present embodiment. The present embodiment has a configuration in which the above-described second embodiment and fourth embodiment are combined, and the same reference numerals are given to the configurations corresponding to the above-described embodiments, and a description thereof will be omitted.

In the present embodiment, as illustrated in FIG. 11, the airtightness maintaining member 20 has a fold reinforcing part 26, a triangular prism reinforcing part 27, and a second fold reinforcing part 28.

In the present embodiment, it is possible to prevent the welded portion of the clamping part 14 from peeling off due to an external force, and to reinforce the triangular prism parts 14c and 14d, which need to be reinforced in terms of strength and require rigidity, thereby improving the strength.

Also in the present embodiment, the same effects as those of each of the above-described embodiments can be obtained.

Hereinafter, a pouch cell according to a sixth embodiment of the present invention will be described with reference to the drawings.

Figure 12:
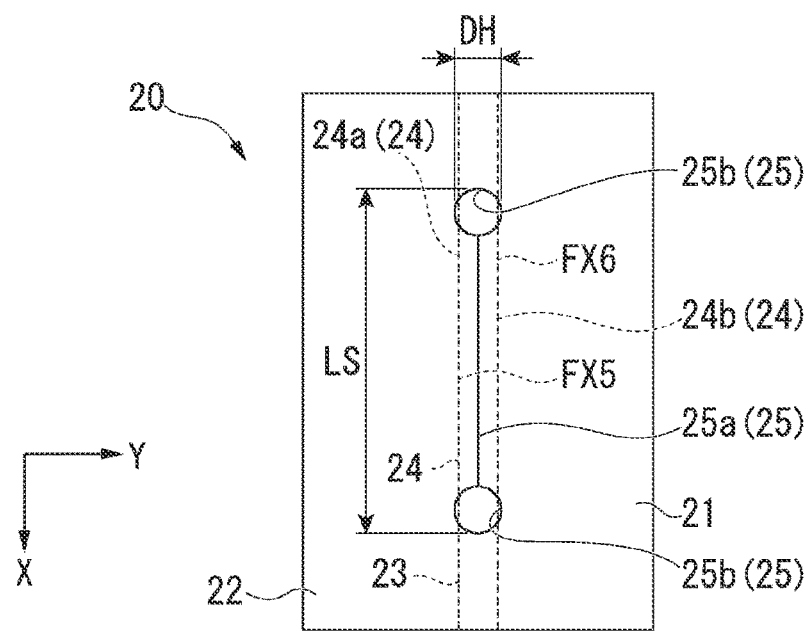
FIG. 12 is a partially developed view illustrating an airtightness maintaining member forming a pouch cell according to a sixth embodiment of the present invention.

FIG. 12 is a partially developed view illustrating an airtightness maintaining member forming the pouch cell in the present embodiment. In the present embodiment, a difference from the first to fifth embodiments described above is that a shape of the slit is related, and the same reference numerals are given to the configurations corresponding to the embodiments described above, and a description thereof will be omitted.

As illustrated in FIG. 12, the airtightness maintaining member 20 in the present embodiment has a circular contour of the end slit 25b of the slit 25 in the developed view.

Here, in the end slit 25b, a dimension DH in the Y direction, that is, the diameter DH of the end slit 25b is $$TL \le DH$$

as compared with a thickness dimension TL of the current collecting tab lead 12.

As a result, the airtightness maintaining member 20 can maintain sufficient airtightness at both end portions of the current collecting tab lead 12 in the X direction.

Further, the maximum dimension LS of the slit 25 in the X direction in the developed view is $$LT \le LS \le LT + 2FT,$$

LS−DH≤LT with respect to the length of the current collecting tab lead 12 in the X direction, that is, a width dimension LT, and a thickness dimension FT of the airtightness maintaining member 20.

Here, when the maximum dimension LS in the X direction of the slit 25 is smaller than the width dimension LT of the current collecting tab lead 12, the airtightness maintaining member 20 interferes with the current collecting tab lead 12, which is not preferable. Further, when the maximum dimension LS in the X direction of the slit 25 is larger than LS+2FT, the distance between the current collecting tab lead 12 and the airtightness maintaining member 20 in the X direction increases at the end portion of the clamping part 14 in the Y direction, and the airtightness decreases.

Further, it is possible to prevent the current collecting tab lead 12 and the slit 25 from interfering with each other by making the maximum dimension LS of the slit 25 in the X direction smaller than LT+DH.

Further, the length in the Y direction, that is, a width dimension SW of the central slit 25a in the developed view is $$SW \le TL/2$$

with respect to the length in the Z direction, that is, a thickness dimension TL of the current collecting tab lead 12.

Here, the width dimension SW of the central slit 25a can be preferably made as small as possible. When the width dimension SW of the central slit 25a becomes large, the length of the extending part 24 in the Y direction becomes small, and the airtightness may be reduced, which is not preferable.

Also in the present embodiment, the same effects as those of each of the above-described embodiments can be obtained.

Figure 13:
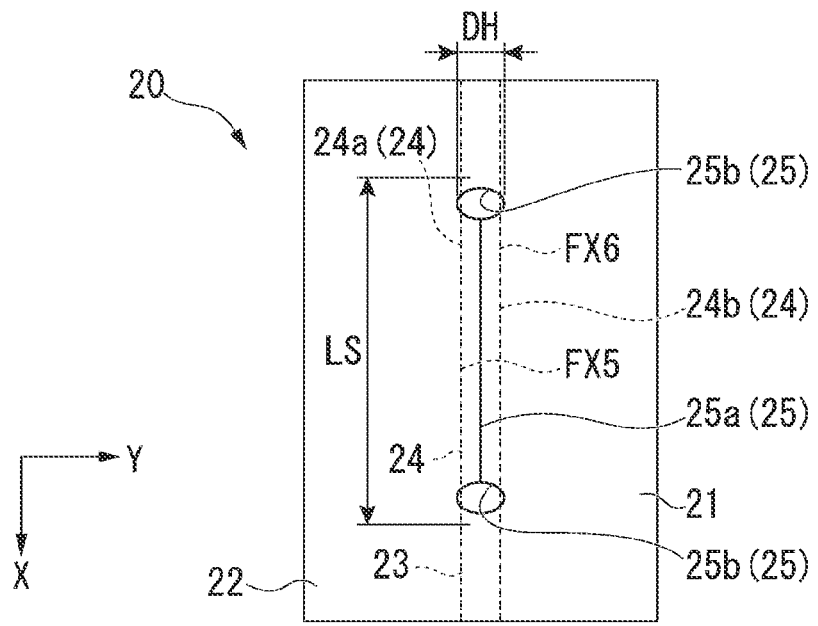
FIG. 13 is a partially developed view illustrating another example of the airtightness maintaining member forming the pouch cell according to the sixth embodiment.
Figure 14:
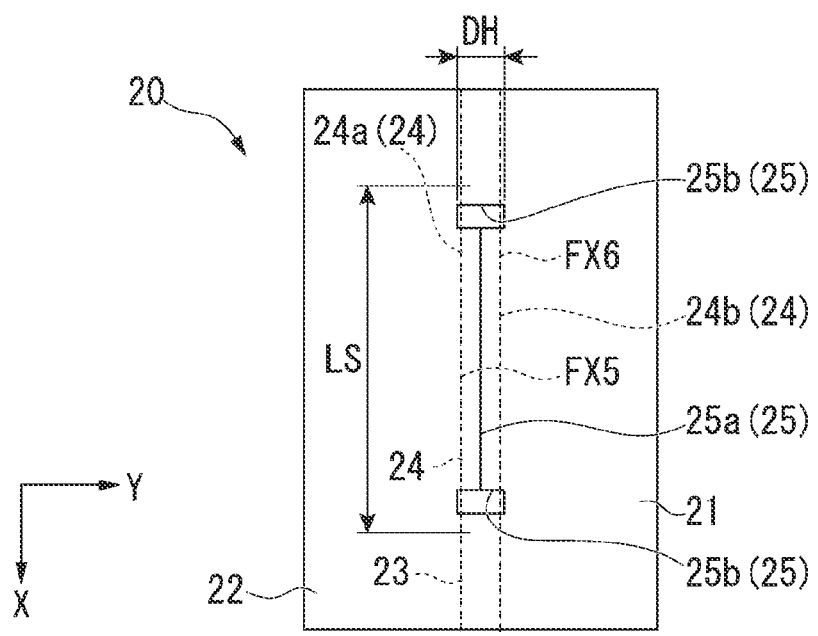
FIG. 14 is a partially developed view illustrating another example of the airtightness maintaining member forming the pouch cell according to the sixth embodiment.
Figure 15:
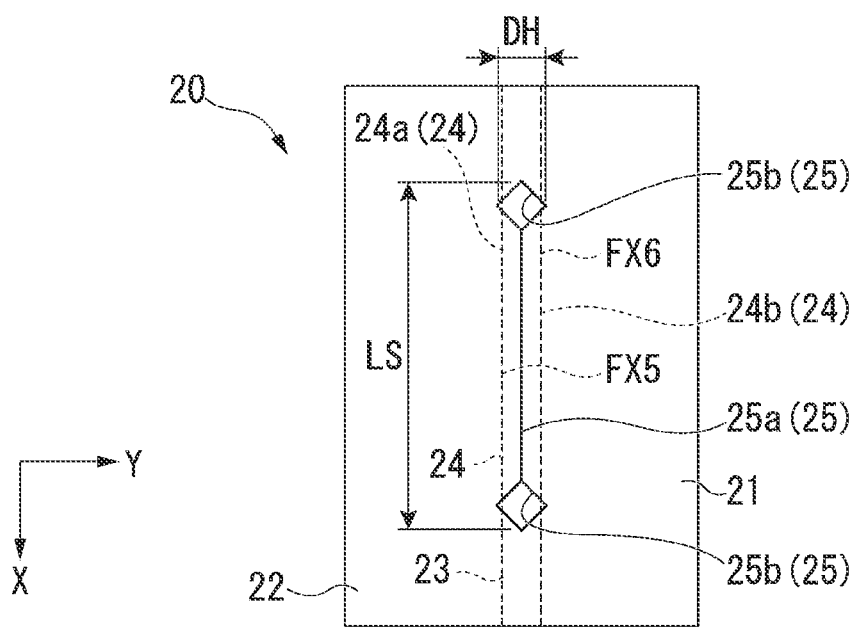
FIG. 15 is a partially developed view illustrating another example of the airtightness maintaining member forming the pouch cell according to the sixth embodiment.

Further, in the present embodiment, in addition to the circular shape illustrated in FIG. 12, the contour of the end slit 25b can adopt a configuration such as an elliptical shape illustrated in FIG. 13, a rectangular shape illustrated in FIG. 14, and a diamond shape illustrated in FIG. 15. Even in these cases, the length DH of the end slit 25b in the Y direction can satisfy the above-described relationship. At the same time, even in these cases, the maximum dimension LS of the slit 25 in the in the X direction can satisfy the above-described relationship.

Even in the embodiment having such configurations, the same effects as those in each of the above-described embodiments can be obtained.

Further, in the present invention, it is possible to individually combine the respective configurations in each of the above embodiments, or to adopt a configuration in which a specific structure is removed.

Further, when it is desired to increase the thickness dimension of the clamping part 14, the number of airtightness maintaining members 20 attached to the clamping part 14 can be preferably increased. Further, when it is desired to reduce the thickness dimension of the clamping part 14, the number of airtightness maintaining members 20 attached to the clamping part 14 can be preferably reduced, or in the airtightness maintaining member 20, areas of the front reinforcing part 21 and the back reinforcing part 22 attached to the clamping part 14 can be preferably reduced.

As an example of utilization of the present invention, a pouch cell for an in-vehicle use can be mentioned in particular. The requirements in this case are to be able to withstand a wide range of disturbances such as various climates, temperatures, altitudes, and vibrations due to rough roads and collisions. Therefore, it is necessary to have water resistance, gas permeability resistance, and vibration resistance from the atmosphere, which are required at a higher level than those for consumer use.

What is claimed is:

1. A pouch cell comprising:
a charging and discharging element;
a current collecting tab lead configured to be thinner than the charging and discharging element and drawn out of the charging and discharging element to an outside;
an exterior film configured to wrap the charging and discharging element in a state in which the current collecting tab lead is drawn out to an outside;
a clamping part configured to clamp the current collecting tab lead from the exterior film by front and back surfaces in a thickness direction; and
an airtightness maintaining member mounted to cover an end portion of the clamping part,
wherein the airtightness maintaining member is separated from the exterior film, has a slit through which the current collecting tab lead is drawn out to the outside and has a bent part which covers an end portion of the clamping part,
a dimension of the bent part in the thickness direction of the clamping part is larger than a width dimension of the slit, and
the airtightness maintaining member has a triangular prism reinforcing part which is attached closer to the charging and discharging element than to the clamping part.

2. The pouch cell according to claim 1,
wherein the airtightness maintaining member has an extending part which is in contact with the current collecting tab lead and extends in a drawing direction of the current collecting tab lead.

3. The pouch cell according to claim 1,
wherein the airtightness maintaining member has a fold reinforcing part which is folded back along a contour of the clamping part.

4. The pouch cell according to claim 1,
wherein the triangular prism reinforcing part has a second fold reinforcing part which is attached to a gusset part that is closer to the charging and discharging element than to the clamping part.

5. The pouch cell according to claim 1,
wherein the slit has a central slit which extends along the front and back surfaces of the current collecting tab lead in the thickness direction and has end slits which extend in the thickness direction of the current collecting tab lead at both ends of the central slit, and
the slit in the airtightness maintaining member before the airtightness maintaining member is mounted on the clamping part has a H shape.

\* \* \* \* \*